(12) United States Patent
Hehn

(10) Patent No.: US 7,686,364 B2
(45) Date of Patent: Mar. 30, 2010

(54) FLIP HINGED LID

(75) Inventor: Wilhelm Hehn, Aham (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 1344 days.

(21) Appl. No.: 11/136,439

(22) Filed: May 25, 2005

(65) Prior Publication Data

US 2005/0282599 A1  Dec. 22, 2005

(30) Foreign Application Priority Data

May 26, 2004 (DE) .................. 10 2004 025 655

(51) Int. Cl.
*B60R 13/00* (2006.01)

(52) U.S. Cl. .................. 296/24.34; 296/37.8; 220/812; 220/817

(58) Field of Classification Search .............. 296/24.34, 296/37.8, 153; 49/382; 16/357, 361, 362; 220/812, 813, 817, 345.1
See application file for complete search history.

(56) References Cited

U.S. PATENT DOCUMENTS

| | | | |
|---|---|---|---|
| 5,067,625 A * | 11/1991 | Numata | 220/827 |
| 5,210,906 A * | 5/1993 | Aihara et al. | 16/232 |
| 5,647,652 A | 7/1997 | Zalewski et al. | |
| 5,931,336 A | 8/1999 | Takeuchi | |
| 6,250,729 B1 | 6/2001 | Allison et al. | |

FOREIGN PATENT DOCUMENTS

| | | |
|---|---|---|
| DE | 101 51 704 C2 | 10/2003 |
| DE | 101 64 340 C1 | 10/2003 |
| EP | 1 304 439 A2 | 4/2003 |

* cited by examiner

*Primary Examiner*—Dennis H Pedder
*Assistant Examiner*—Pinel E Romain
(74) *Attorney, Agent, or Firm*—Sughrue Mion, PLLC

(57) ABSTRACT

The invention relates to a lockable housing, to take a telephone for example, especially for use in vehicles, with a lid element pivoted around one of two opposing axes, characterised in that the lid element and housing are supported so as to be capable of sliding in opposite directions to each other longitudinally along the axes and that the swivel bearings for the respective swivelling movement are offset in relation to each other in the direction of the swivel axes and are disposed in such a manner that the lid element only engages with the swivel bearing or swivel bearings of one axis in each case.

12 Claims, 2 Drawing Sheets

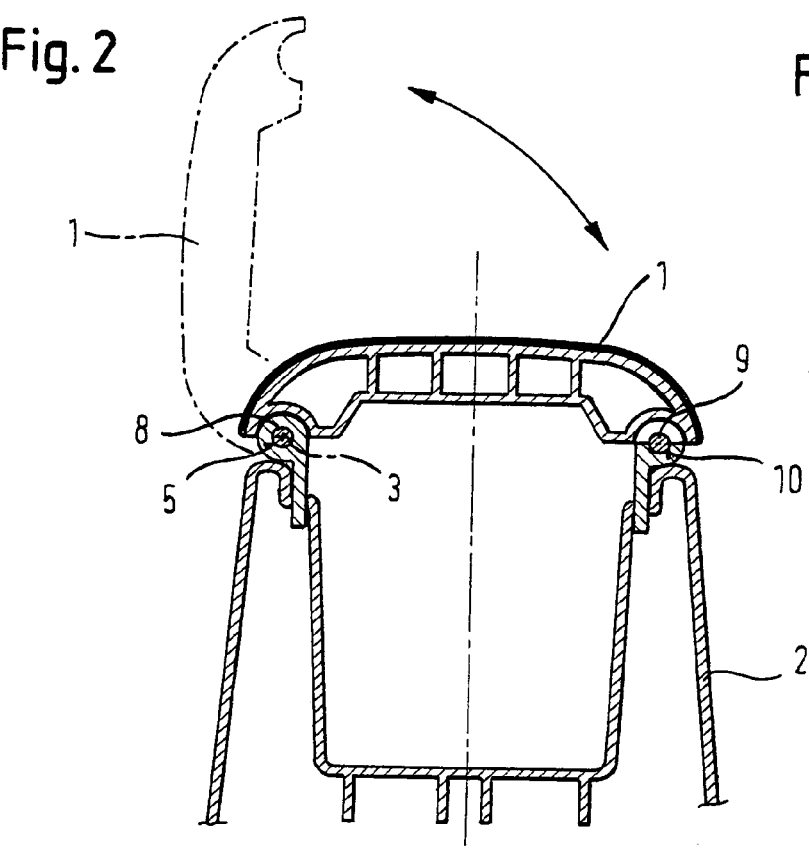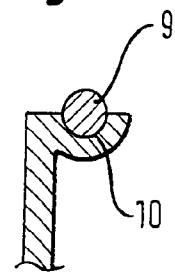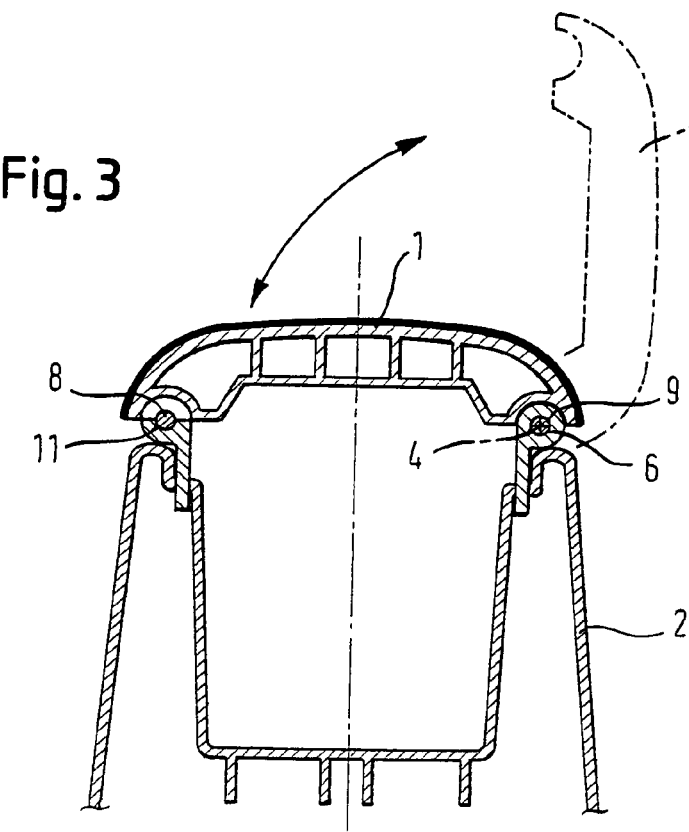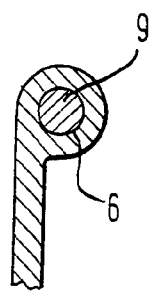

FLIP HINGED LID

FIELD OF THE INVENTION

The invention relates to a lockable housing, to take a telephone for example, especially for use in vehicles, with a lid element pivoted around one of two opposing axes.

PRIOR ART

In the central armrests or in the central console of vehicles, primarily in vehicles of the executive class and luxury class, there are storage compartments which may serve to take objects to be stowed, for example a car telephone. These are usually covered by means of hinged lid elements or sliding shutters.

In this case, hinged lid elements are disposed on a frame or a container in such a manner that they are pivotable around at least one swivel axis by approximately 90°.

U.S. Pat. No. 5,931,336, for example, provides a container in which the lid can be pivoted respectively around two opposing axes of rotation which lie parallel to the lateral surfaces of the container. As a result of this it is possible to open the container from both the driver's and the passenger's side and thus to gain access to the objects stored, in particular to a telephone stored in the container. Thus occupants of the vehicle gain unimpeded access to the inside of the container in both opened states. However, it turned out in practice that with a container of this type it was not possible to prevent simultaneous detachment of retaining devices on both swivel axes in an adequate manner.

Therefore, elaborate structures to prevent simultaneous detachment of retaining devices on both swivel axes were designed and disposed especially inside the lid element as a result of which simultaneous detachment on both sides of the housing was prevented. Such locking devices known from practical use consist of a large number of spring elements plus force transmission elements and controlling elements interacting with each other, which are disposed in the lid by means of screwing and/or welding.

However, the manufacture of such locking devices turns out to be extremely time-consuming and expensive. Furthermore, such locking devices are exceptionally susceptible to faults due to their elaborate mechanics.

DESCRIPTION OF THE INVENTION

Thus it was an object of the invention to provide a lockable and hinged housing, in particular for use in vehicles, which does not exhibit the problems known from the prior art.

A lockable housing is provided, which reliably guarantees the desired method of functioning even with frequent use due to its especially simple design. Furthermore, the lockable housing according to the invention is especially easy to operate and extremely low-cost in its manufacture.

The method of functioning is achieved in this case in that the lid element and the housing are disposed so as to be capable of sliding in opposite directions to each other longitudinally along the swivel axes which are generally disposed parallel to each other. A sliding arrangement such as this can be effected both by sliding the body of the housing to be covered relative to the interior of the vehicle and also by sliding the lid element only, lastly by a combination of these two movements.

In this case the swivel bearings for the respective swivel movement in the direction of the swivel axes, thus also in the sliding direction of the housing and/or lid element, are offset. At the same time the offset arrangement is preferably designed so that at each point the lid element to be swivelled only engages with the swivel bearing or the swivel bearings of one axis at most.

Consequently this reliably ensures that a swivel movement can always only take place around one swivel axis. Enabling of the swivel movement around the swivel axis dictated by the respective swivel bearings can in this case be effected by enabling means preferably disposed opposite this swivel axis.

Thus a lockable housing is provided in which simultaneous detachment of the lid element on two opposing sides of the housing is reliably prevented, whereby it is possible to dispense almost completely with the use of elaborate locking and/or enabling devices.

In a further preferred embodiment of the invention, the housing and the lid element have at least one position relative to each other in which the swivel bearings on both sides of the lid element engage with each other. This results in the creation of a device which is secured by especially simple means against undesirable opening of the lid element.

In an especially preferred embodiment of the invention, the lid element is opened by sliding the lid element out of this engaged position in preferably two opposing directions into a first position for swivelling in a first direction and preferably into a second position for swivelling in a second direction. In a most especially preferred embodiment of the invention, each of the sliding directions has such a first and second position.

In an extremely preferred embodiment of the invention, additional fixing or interlocking elements are provided to secure the lid element in the position in which both swivel bearings are engaged. As a result of this the housing's safety, particularly in the event of an accident or the like, is increased especially effectively with simple means.

In a further preferred embodiment of the invention, each axis is assigned exactly one pair of swivel bearings for the swivel movement. In an especially preferred embodiment, engaging in the swivel bearings of a first axis produces interlocking of the lid element in respect of a second swivel movement. This ensures that without the execution of further retaining devices, simply by bringing the lid element into positive connection with the swivel bearings of a respective axis, detachment of the lid element is prevented on this side.

In a further preferred embodiment, the swivel axes are disposed parallel to the longitudinal axes of the housing. This enables the lid element to be hinged open towards both the driver's and also the passenger's side.

In a preferred embodiment of the invention, the swivel bearings of the respective axes are the same distance apart but are offset in relation to one another in the longitudinal direction of the housing in relation to the opposing axis. In an especially preferred embodiment of the invention, the elements of the lid element engaging in the swivel bearings are not offset in relation to each other.

This results in the provision of an especially simple embodiment of the invention by means of which the method of functioning according to the invention is achieved with particular ease. However, in this case an embodiment is equally preferred in which the swivel bearings are not arranged offset in relation to each other on the housing, and staggering of the elements engaging in the bearings is realised on the lid element. Finally, an embodiment is also preferred in which staggering of both the swivel bearings of the respective axes and also of the elements engaging in these bearings is realised on the housing and on the lid element.

In a further preferred embodiment of the invention, the relative sliding of the lid element and housing takes place exclusively in the closed condition of the housing. This ensures that detachment of the lid from the housing due to the swivel bearings failing to engage on both sides of the housing is prevented by especially simple means.

In a further preferred embodiment of the invention, the lockable housing is located in the area of a vehicle's central console, such as usually used in vehicles as a storage compartment or to take a mobile telephone permanently installed in the vehicle.

In an especially preferred embodiment of the invention, the lockable housing in this position has a lid element which has a specially designed soft arm rest. As a result of this there is an especially preferred increase in the haptics of the lockable housing and in the comfort of the vehicle's occupants.

BRIEF DESCRIPTION OF THE DRAWINGS

The present invention is explained in more detail on the basis of FIGS. 1 to 3, whereby these figures merely show examples of embodiments of the device according to the invention, which is not suited in any way to limit the scope that is defined in the following patent claims. The figures show FIG. 1 a view from above onto the arrangement of the respective swivel bearings in conjunction with the elements engaging in the bearings;

FIG. 2 a cut front view of a housing according to the invention in a first swivelling position;

FIG. 2a an enlarged cut partial view of a journal supported on a seating;

FIG. 3 a cut front view of a housing according to the invention in a second swivelling position; and FIG. 3a an enlarged cut partial view of a journal inserted into a bearing hole.

WAYS TO CARRY OUT THE INVENTION

Figure 1:
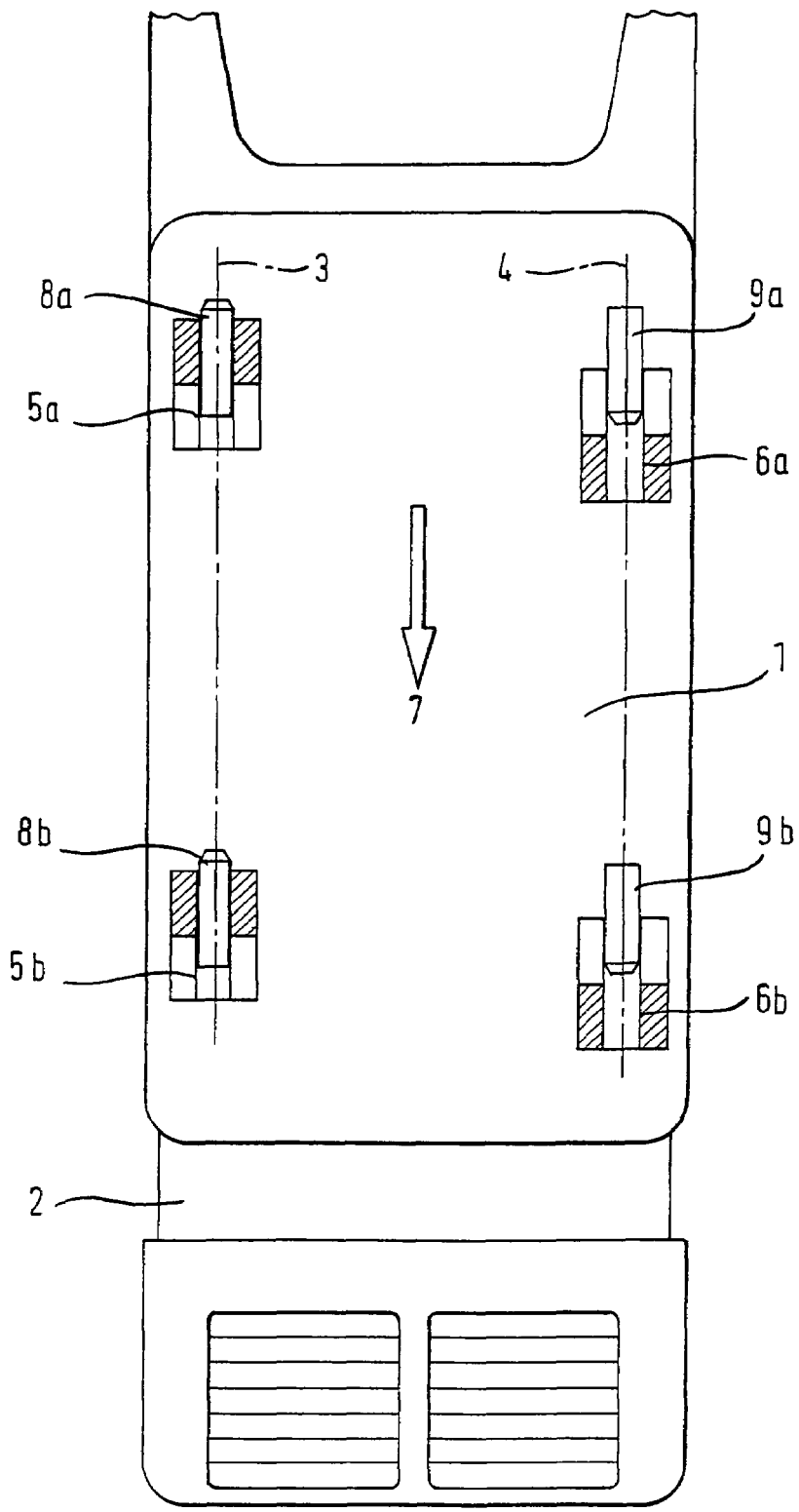

FIG. 1 shows a partially cut top view onto the lid element 1 of a lockable housing 2 according to the invention. Two journals in each case are disposed in the areas of the side edges of lid element 1, each of which is aligned on a swivel axis 3, 4. On the housing (not shown) two respective bearing holes 5a, 5b and 6a, 6b are disposed in the area of swivel axes 3, 4 whereby bearing holes 5 are arranged offset in relation to bearing holes 6 in sliding direction 7 parallel to swivel axes 3, 4. Bearing holes 5a, 5b, 6a, 6b each show a shaded closed area to form a bearing hole for the respective journals 8a, 8b, 9a, 9b and a section that is not shaded and not closed to form a support for the respective journals 8a, 8b, 9a, 9b. This ensures that when journals 8a, 8b are pushed into bearing holes 5a, 5b, journals 9a, 9b lie outside bearing holes 6a, 6b.

FIGS. 2 and 2a show a housing 2 with lid element 1 whereby lid element 1 is shown in both a closed position and also in a position swivelled 90o around swivel axis 3. Journal 8 is completely enclosed by bearing hole 5 whereas journal 9 lies on a seating 10 and thus enables the lid element on the right-hand side of the drawing to be released.

FIGS. 3 and 3a show a housing 2 according to the invention with lid element 1 in which lid element 1 is shown in both a closed position and also in a position swivelled 90o around swivel axis 4. In this case journal 8 lies on a seating 11 in the closed position of lid element 1 whereas journal 9 is disposed inside bearing hole 6. This enables a swivelling movement around swivel axis 4 analogously with FIG. 2.

What is claimed is:

1. Lockable housing, with a hinged lid element pivotable around one of two opposing axes, respectively characterized in that the lid element and housing are supported so as to be capable of sliding in opposite directions to each other longitudinally along the axes and that swivel bearings for the respective swivel movement are offset in relation to each other in the direction of the swivel axes and are disposed in such a manner that the lid element engages with at least one of the swivel bearings of only one axis in each case.

2. Lockable housing according to claim 1 characterized in that engaging in the swivel bearings of a first axis causes interlocking of the lid element in respect of a second swivel movement.

3. Lockable housing according to claim 1 characterized in that the swivel axes are disposed parallel to the longitudinal axes of the housing.

4. Lockable housing according to claim 1, characterized in that one pair of swivel bearings is allocated to each axis.

5. Lockable housing according to claim 1, characterized in that the swivel bearings of the two axes are equidistant and disposed in the longitudinal direction of the housing to be offset in relation to each other.

6. Lockable housing according to claim 4, characterized in that the elements of the lid element engaging in the swivel bearings are not disposed offset in relation to each other.

7. Lockable housing according to claim 1, characterized in that relative displacement of the lid element and the housing places the lid element variously in a first open position, a closed position and a second open position relative to the housing and that the closed condition immediately precedes and follows both the first open position and the second open position.

8. Lockable housing according to claim 1, characterized in that the lid element and housing are disposed in the area of a vehicle's central console.

9. Lockable housing according to claim 8, characterized in that the lid element has a soft arm rest.

10. Lockable housing according to claim 1, configured to be mounted in a vehicle.

11. Lockable housing according to claim 10, configured to be mounted adjacent a passenger seat.

12. Lockable housing according to claim 10, configured to house a telephone.

* * * * *